United States Patent [19]

Rasmussen et al.

[11] 4,360,228
[45] Nov. 23, 1982

[54] BUMPER APPARATUS

[76] Inventors: Eldon S. Rasmussen, 6035 S. Flynn Rd., Indianapolis, Ind. 46241; John P. VanderMaas, 16728 State Rd. 4, Goshen, Ind. 46526

[21] Appl. No.: 211,239

[22] Filed: Nov. 28, 1980

[51] Int. Cl.³ ............................................. B60R 19/04
[52] U.S. Cl. .................................... 293/118; 292/205
[58] Field of Search ............... 293/34, 35, 36, 116, 293/117, 118, 119, 103, 155; 292/202, 205

[56] References Cited

U.S. PATENT DOCUMENTS

| | | | |
|---|---|---|---|
| 1,447,387 | 3/1923 | Heil | 293/118 |
| 1,515,111 | 11/1924 | Heil | 293/118 |
| 1,779,661 | 10/1930 | Cleland | 224/42.08 |
| 3,005,657 | 10/1961 | Walker | 296/37.2 |
| 3,533,654 | 10/1970 | Kannegieter | 293/118 |
| 3,618,835 | 11/1971 | Terry | 293/117 |
| 3,871,695 | 3/1975 | Koenig | 293/118 |
| 3,876,237 | 4/1975 | Hayes, Jr. | 292/202 |
| 4,300,793 | 11/1981 | Benzel | 292/205 |

*Primary Examiner*—Joseph F. Peters, Jr.
*Assistant Examiner*—John A. Carroll
*Attorney, Agent, or Firm*—Woodard, Weikart, Emhardt & Naughton

[57] ABSTRACT

A bumper apparatus is disclosed herein which includes a bumper mounted to a vehicle frame to be pivotable about a horizontal axis transverse of the vehicle and to have a first, up position and a second, down position. Means are provided for locking the bumper in the up position and which include a locking member pivotably attached to the bumper and pivotable about a vertical axis when the bumper is in the up position. Upon pivoting of the locking member it engages the vehicle frame and holds the bumper up. An arm member is also attached to the locking member to provide for operation of the locking means. A pair of such locking members are included, one on each side of the vehicle. A spare tire is mountable within a tire rack located immediately forward of the bumper, and other equipment may also be similarly located and held therein secure from unauthorized access while being easily accessed by the user of the vehicle.

9 Claims, 4 Drawing Figures

BUMPER APPARATUS

BACKGROUND OF THE INVENTION

1. Field of the Invention

The present invention relates generally to the field of bumper devices for vehicles, and more particularly to a bumper which is movably attached to the rear of a truck or similar vehicle to facilitate access to a tire and/or other equipment mounted behind the bumper.

2. Description of the Prior Art

Various bumper designs have been proposed in the prior art to accommodate a variety of purposes and functions. Typical bumpers are designed to absorb impact against the front or rear of the vehicle, and some bumpers have recently been designed to move against a resisting force to minimize damage to the vehicle upon such impact.

A shiftable bumper for mounting to the rear of a truck is disclosed in U.S. Pat. No. 3,533,654, issued to Kannegieter on Oct. 13, 1970. The Kannegieter patent shows a bumper pivotally mounted to the truck frame and movable between a horizontal, up position and a vertical, down position. The bumper includes latch assemblies including rearwardly projecting arms pivotally secured to the bumper and pivotally carrying latches cooperable with a pin to hold the bumper in the up position. A spring biases the arm upwardly and in engagement with a stop and holds the latch in the lock position, until a release lever is actuated to permit movement of the bumper to the down position. A spare tire is mounted in a carrier attached to the truck frame forwardly of the bumper, such that the tire is accessible when the bumper is in the down position.

In contrast to the present invention, the Kannegieter device is relatively complex, expensive, not readily adaptable to various truck designs, and includes several components which may fail or become inoperable due to wear and exposure. The present invention includes a bumper which is easily manipulated and simply mounted to the truck frame to be easily mounted to various truck configurations, with a minimum of cost and failure.

Various other movable bumpers are also disclosed in the prior art. In the Koenig patent, U.S. Pat. No. 3,871,695 issued on Mar. 18, 1975, there is disclosed a folding truck bumper attached to underside of the rear of a vehicle. The Koenig device includes a bumper extending downwardly on a support pivotally attached to the truck frame, and having a forward and upward position as well. A second, supporting member is pivotally attached to the truck frame forward of the bumper and includes holes positioned to align with a hole in a member attached to the bumper, such that connection of one of the two holes with the supporting member with the bumper will lock the bumper in one or the other of the bumper positions. Movable bumper designs of less interest are disclosed in U.S. Pat. Nos. 3,005,657, issued to Walker on Oct. 24, 1961; 1,779,661, issued to Cleland on Oct. 28, 1930; 1,515,111, issued to Heil et al. on Nov. 11, 1924; and, 1,447,387, issued to Heil et al. on Mar. 6, 1923.

SUMMARY OF THE INVENTION

Briefly described in one aspect of the present invention there is provided a bumper apparatus for a truck or similar vehicle including a bumper mounted to the vehicle frame pivotable about a horizontal axis transverse of the vehicle, and thereby having a first, up position and a second, down position. The bumper apparatus further includes locking means mounted to a support member or the bumper and including a locking member pivotable about a vertical axis when said bumper is in the up position to engage the vehicle frame and lock the bumper.

It is an object of the present invention to provide a bumper apparatus mountable to a vehicle frame and providing a bumper having a first, up position and a second, down position.

It is a further object of the present invention to provide a bumper apparatus including a movable bumper which is readily adapted for mounting on a variety of different vehicles, and which includes a minimum of parts.

Another object of the present invention is to provide a bumper apparatus which is easily manipulated between the up and down positions, and which is securely locked in the up position.

A further object of the present invention is to provide a bumper apparatus which includes a bumper which is lowered to provide access to a spare tire received in a tire carrier mounted to the vehicle frame forward of the bumper.

It is another object of the present invention to provide a bumper apparatus which provides security for the spare tire of a vehicle, and which also permits quick and easy access to the spare tire when needed.

It is a further object of the present invention to provide a bumper apparatus which provides security for other equipment such as the vehicle jack, spare parts, tool box and similar items.

Further objects and advantages of the present invention will become apparent from the description of the preferred embodiment which follows.

DESCRIPTION OF THE PREFERRED EMBODIMENT

Figure 1:
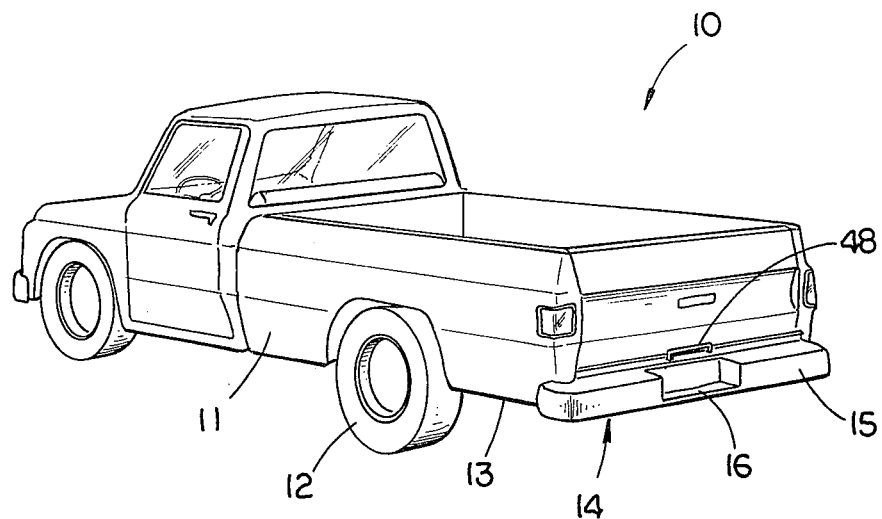
FIG. 1 is a rear end perspective view of a truck including a bumper apparatus according to the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a truck 10 having a body 11, wheels 12 and frame 13. Mounted to the rear of the truck 10 is a bumper apparatus 14 constructed in accordance with the present invention. Bumper apparatus 14 includes a bumper 15 pivotally mounted to the frame 13, as will be further described below. Bumper 15 includes an aperture 16 for a trailer hitch and preferably has a handle 48 to facilitate operation of the bumper apparatus.

Although the present invention is described with respect to a truck, it will be appreciated that the invention is equally suitable for use with other similar vehicles. For example, the bumper apparatus of the present invention could also be used with jeeps, motor homes, vans, larger trucks and other four wheel drive vehicles, and a wide variety of other such vehicles. It is a particular feature of the present invention that the bumper apparatus function to protect and act as a security for a spare tire, tools and other equipment stored in front of the bumper, and thus there is a particular advantage in using the bumper apparatus in those vehicles having a need or desire for providing such storage. However, the bumper apparatus functions as well and does not require the presence of such equipment, and therefore is not intended to be limited thereby.

Figure 2:
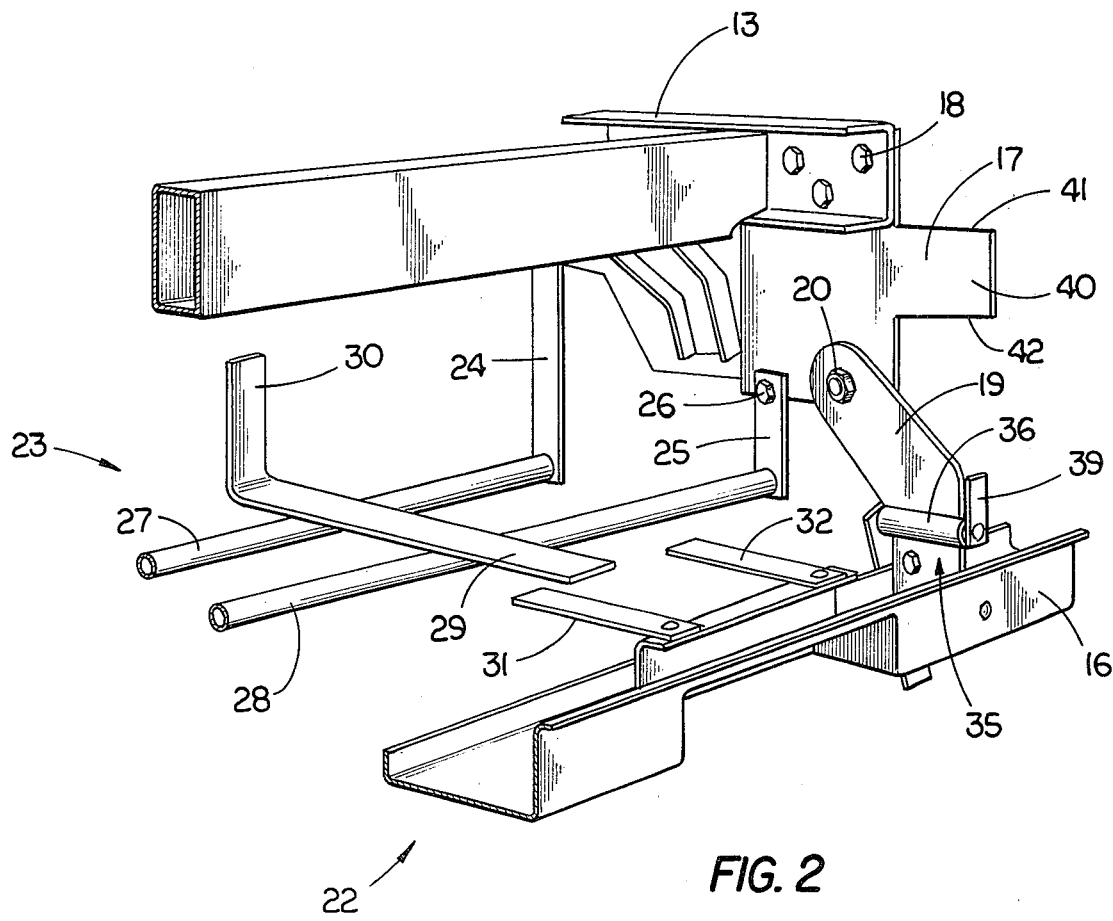
FIG. 2 is a partial perspective view of the bumper apparatus of the present invention, particularly shown mounted to the frame of a vehicle.
Figure 3:
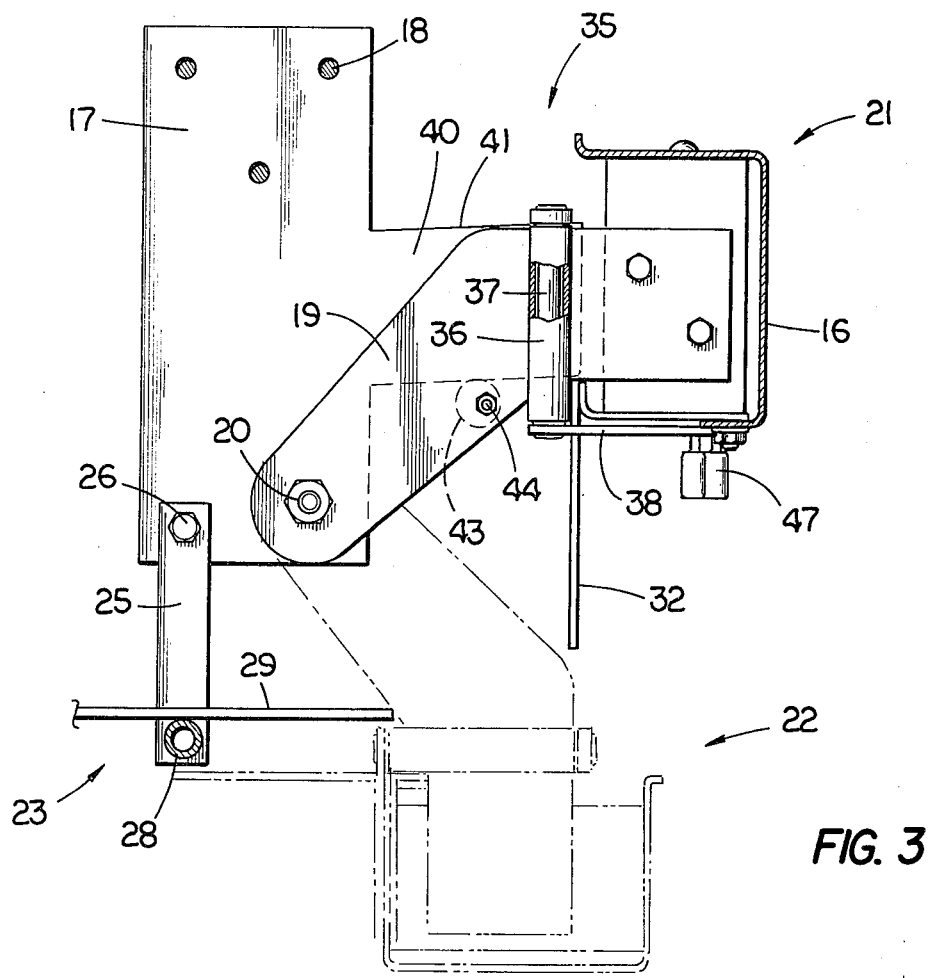
FIG. 3 is a side, cross-sectional view of a bumper apparatus according to the present invention.

Referring now to FIGS. 2 and 3, it is shown that the preferred embodiment for the bumper apparatus 14 of the present invention includes a mounting means for mounting the bumper 15 to the vehicle frame to be pivotable about a horizontal axis, extending transverse of the vehicle, to provide the bumper with a first, up position 21 and a second, down position 22 (FIG. 3). Such mounting means preferably includes support members 17 secured to the vehicle frame 13, such as by nut and bolt combinations 18. The apertures for the nuts and bolts are generally provided at the indicated locations for the direct mounting of the bumper in such vehicles. Thus, the present invention is readily adapted for mounting on a variety of vehicles simply by removing the bumper on the vehicle and attaching the support members 17 to the opposite sides of the vehicle frame in the indicated locations.

More specifically, it is advantageous to provide the support members with several holes and/or slots to make a single support member useful in mounting the bumper apparatus to a variety of vehicle frames. Alternatively, it will be appreciated that the support members 17 could be attached at different locations or by other means, such as by welding the members to the frame or attaching it with clamps. The indicated attachment is preferred, however, since it does not require modification of the vehicle frame and may be accomplished quickly and simply.

The mounting means also preferably includes a pair of bumper supports 19 attached to the bumper and pivotally mounted to the support members 17. The bumper supports may be secured to the bumper in a variety of known manners, and preferably is attached by use of the standard mounting brackets incorporated in the bumper for use in the direct attachment of the bumper to the vehicle frame. Again, the use of such available mounting means in the bumper make the present invention readily adaptable for use with existing vehicles, and the provision of appropriate apertures and/or slots in the bumper mounts will make them useful with a variety of vehicles. Alternatively, the bumper could be modified for use with the bumper mounts, or the mounts could, for example, be welded directly to the bumper.

It will also be appreciated that the present invention does not require the use of both the support members and the bumper mounts, since the bumpers could be pivotally mounted to the vehicle frame to be rotatable about a horizontal, transverse axis. However, in typical vehicles it is desirable to provide the pivot axis in the position indicated in the drawings in order to get proper positioning of the bumper in both the up and down positions. More particularly, it will be noted that the pivot axis in the drawings is significantly below the vehicle frame. If this were not the case, the pivot arm attaching the bumper to the frame would have to be significantly longer to provide the same clearance space between the bumper and the frame when the bumper is in the down position. Also, the lower pivot makes the manipulation of the bumper between the up and down positions easier for the user of the apparatus.

As also shown particularly in FIG. 2, there is desirably provided a tire rack, indicated generally at 23, directly forward of the bumper apparatus. The tire rack 23 includes a first pair 24 and a second pair 25 of downwardly extending supports attached to the frame by suitable means such as welding. Preferably, the rear supports 25 and secured, such as by bolts 26, to the support member 27 affixed to the frame. Cross members 27 and 28 extend between the downwardly extending supports and are secured thereto. A longitudinal support bar 29 is welded to the cross members, and includes an upturned front end 30 to prevent forward displacement of a tire received in the tire rack. A pair of retaining members 31 and 32 are secured to the bumper, such as by bolts 33, and cooperate with the other members of the tire rack to retain a tire therein.

In accordance with the described tire rack and bumper apparatus, it will be appreciated that the up and down positions of the bumper permit the ready access to a spare tire, and other equipment, stored in the area immediately in front of the bumper. The tire rack is size to receive a spare tire for the vehicle to which it is mounted. The upward bend 30 of the support bar 29 defines the forward limit for the tire rack, and the retaining members 31 and 32 define the rearward limit. The positioning of these members may be selected to firmly hold the spare tire therebetween when the bumper is in the up position, thus preventing the tire from moving around while the vehicle is in motion. Also, separate attachment means may be provided to securely hold the spare tire within the tire rack and to prevent its movement. Such separate attachment means could, for example, include means for bolting the tire down in the same manner as is typically used to hold spare tires in the trunks of many existing automobiles.

When access to the tire is required, the bumper apparatus is simply manipulated to lower the bumper and expose the tire rack. The retaining members in this down position for the bumper also cooperate with the tire rack members to provide a support for sliding the tire out from the tire rack, or conversely for sliding the tire into the rack. It will be appreciated that other equipment could also be stored in this area in front of the bumper, and in this manner the equipment would be protected and secured while the bumper is in the up position, but could be easily accessed by lowering the bumper.

Locking means are also provided for locking the bumper in the up position, and thus also for locking the spare tire and other equipment behind the bumper as desired. The locking means preferably includes a pair of separate locking devices 34 and 35, one being mounted at each side of the bumper and particularly associated with one of the support members. Each of the locking devices is essentially identical, and therefore only one of these devices 35 will be described in detail herein.

The locking means 35 includes a sleeve 36 secured to the support members 19, such as by welding, and oriented to have a vertical, central cavity when the bumper is in the up position 21 (FIG. 3). A shaft 37 is received within the sleeve 36 and is secured at its bottom end to an arm member 38 and at its top end to a locking member 39. In this manner, the arm member and locking member are pivotable about a vertical axis when the bumper is in the up position. As will become further apparent, this orientation is advantageous since the operation of the bumper apparatus, and particularly the lever arm available as a result, is enhanced by this orientation. Also, the apparatus is thereby operable with a minimum of moving parts and without components, such as springs, which could fail or become inoperative due to exposure to use conditions of the vehicle.

The locking member, and therefore the arm member, has two positions corresponding with the locking and unlocking of the bumper in the up position. In the locking position (FIG. 4), the locking member engages the vehicle frame to hold the bumper up, while in the unlocked position 46 (FIG. 4) the locking member is disengaged from the vehicle frame and the bumper is free to be pivoted downwardly. The handle 48 and the arm members 38 provide good holding points for raising and lowering the bumper.

The support member 17 includes a rearwardly extending projection 40 which includes a top surface 41 and a bottom surface 42. The top surface 41 is positioned to be engaged by the locking member 39 when the locking member and arm member are pivoted into the locking position. More specifically, the bumper is moved into the up position and locked in that position by then pivoting the locking member over the rearward projection 40, causing the locking member to engage the top surface 41 of the projection. To enhance the firm friction engagement of the locking member and projection, the top surface 41 is inclined upwardly in the rearward direction so that the locking member will initially clear the top surface and with continued rotation will touch and then firmly engage the projection.

To further enhance this engagement, the bumper support 19 carries an eccentric wheel 43 pivotally mounted to the bumper support such as by a nut and bolt combination 44 (FIG. 3). The eccentric 43 is positioned to engage the bottom surface 42 of the projection when the bumper is raised to the up position. The eccentric and the locking member thus cooperate to provide a firm locking of the bumper to the frame, or more particularly to the support member at each side of the frame. To provide adjustment of this cooperation, or perhaps to account for wear of parts or other misalignment of the components, the eccentric may be rotated about the mounting bolt and then tightened into a position which will give the desired spacing between the eccentric and the locking member to properly engage the projection. The provision of such adjustment means is particularly helpful to avoid problems with the bumper not being firmly held in place and therefore vibrating or rattling during use.

Figure 4:
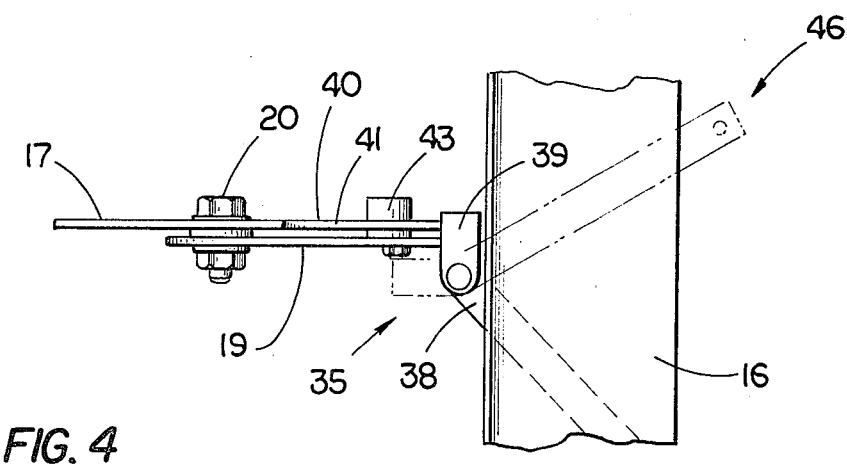
FIG. 4 is a partial, top plan view of the locking portion of the bumper apparatus shown in FIG. 1.

As shown in FIG. 4, the arm members and locking members may be positioned to be almost directly opposite one another. The angle is actually somewhat different from 180° so that the arm members extend slightly rearwardly to facilitate access to the arm members for manipulating the apparatus. The arm members are, however, substantially parallel to and directly beneath the bumper when in the locked position to be out of the way.

Means are preferably provided for securing the arm members in the locked position, and most preferably for locking the arm members to prevent unauthorized access to the spare tire or other equipment behind the bumper. This is readily accomplished by including apertures in the ends of the arm members and providing corresponding apertures in the bumper aligned with the apertures in the arm members in the locked position. A security padlock 47 or the like may then be inserted through the aligned holes in the arm members and bumper to prevent the pivoting of the arm members.

In accordance with this design, the bumper apparatus of the present invention provides a simple, easily operated method for pivoting a bumper to the rear of a truck or similar vehicle to provide access to a spare tire or other equipment located behind the bumper. The pivoting of the arm members about a vertical axis provides a significant mechanical advantage facilitating the operation of the apparatus. In certain prior art devices, attempts to provide for locking a pivoting bumper have involved latching mechanisms which were necessarily relatively short, thus making it difficult to have both a firm sure lock and also a simple and easy operation to latch or unlatch the device. In contrast, the arm members pivot in a manner that they are received beneath and generally parallel to the bumper when in the lock position. In this manner, the arm members can be relatively long providing a good lever arm to make the locking and unlocking maneuver easy to perform.

What is claimed is:

1. A bumper apparatus for mounting a bumper to the rear of the frame of a truck or similar vehicle which comprises:
    a bumper;
    mounting means for mounting said bumper to the vehicle frame to have said bumper pivotable about a horizontal axis transverse of the vehicle frame to have a first, up position and a second, down position;
    locking means for locking said bumper to the vehicle frame in the up position, said locking means including a first arm member and a second arm member, each of said arm members being mounted to one of said mounting means and said bumper to have each of said arm members be pivotable about a vertical axis when said bumper is in the up position, said locking means further including a first locking member attached to the first arm member and a second locking member attached to the second arm member, each of the first and second locking members being operable upon pivoting of the respective arm member to connect with the vehicle frame and lock the bumper in the up position.

2. The apparatus of claim 1 and which further includes a tire rack mounted to the truck frame directly in front of said bumper, said tire rack being closed when said bumper is in the up position and being opened when said bumper is in the down position.

3. The apparatus of claim 1 in which said arm members extend parallel to and beneath said bumper when in the locking position, and in which said arm members are pivoted rearwardly of said bumper when in the unlocked position.

4. The apparatus of claim 3 in which said locking means further includes apertures in the ends of said arm members and in said bumper, the apertures in said arm members and in said bumper being aligned when said bumper is in the up position, and said arm members are in the locked position, said locking means further including a lock received through the aligned apertures of said arm members and said bumper when in the locked position.

5. The apparatus of claim 3 and which further includes a tire rack mounted to the truck frame directly in front of said bumper, said tire rack being closed when said bumper is in the up position and being opened when said bumper is in the down position.

6. The apparatus of claim 1 in which said mounting means includes a pair of support members attached to the vehicle frame, said bumper being pivotally attached to the pair of support members, the support members including rearwardly extending projections, said locking members engaging the top surface of the projections in the locked position.

7. The apparatus of claim 6 in which the top surfaces of the rearwardly extending projections are inclined upwardly in the rearward direction whereby pivoting the locking members along the top surfaces of the projections causes a firm friction fit of the locking members against the projections.

8. The appartus of claim 7 in which the mounting means further includes a pair of bumper mounts secured to said bumper and pivotally attached to the support members, said mounting means further including an eccentric member rotatably mounted to each of the bumper mounts and positioned to engage against the bottom surfaces of the rearwardly extending projections to cooperate with the inclined top surfaces to provide a firm engagement of the bumper with the vehicle frame in the up, locked position.

9. The apparatus of claim 8 and which further includes a tire rack mounted to the truck frame directly in front of said bumper, said tire rack being closed when said bumper is in the up position and being opened when said bumper is in the down position.

* * * * *